United States Patent
Drane et al.

(10) Patent No.: US 8,052,008 B2
(45) Date of Patent: Nov. 8, 2011

(54) ELECTRICAL FLOOR BOX COVER WITH SLIDE LOCKS

(75) Inventors: Mark R. Drane, Germantown, TN (US); Robert K. Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 621 days.

(21) Appl. No.: 11/671,033

(22) Filed: Feb. 5, 2007

(65) Prior Publication Data
US 2007/0209820 A1  Sep. 13, 2007

Related U.S. Application Data

(60) Provisional application No. 60/780,617, filed on Mar. 9, 2006.

(51) Int. Cl.
*H02G 3/08* (2006.01)

(52) U.S. Cl. ........... 220/835; 220/3.3; 220/3.4; 220/3.5; 220/3.6; 220/3.7

(58) Field of Classification Search .................. 220/324, 220/254.9, 3.3, 3.4, 3.5, 3.6, 3.7; 174/66, 174/67, 51, 54
See application file for complete search history.

(56) References Cited

U.S. PATENT DOCUMENTS

| | | | |
|---|---|---|---|
| 4,443,654 A | 4/1984 | Flachbarth et al. | |
| 4,640,564 A | 2/1987 | Hill | |
| 4,659,883 A * | 4/1987 | Poschet | 200/43.03 |
| 4,770,643 A | 9/1988 | Castellani et al. | |
| 4,883,924 A | 11/1989 | Hadfield | |
| 4,984,982 A | 1/1991 | Brownlie et al. | |
| 5,064,969 A | 11/1991 | Bloom | |
| 5,160,808 A | 11/1992 | Hadfield | |
| 5,422,434 A * | 6/1995 | Wuertz et al. | 174/487 |
| 5,584,717 A * | 12/1996 | Radde et al. | 439/330 |
| 5,597,068 A * | 1/1997 | Weisburn et al. | 206/308.1 |
| 5,608,605 A * | 3/1997 | Siow et al. | 361/679.43 |
| 5,669,025 A * | 9/1997 | Sato et al. | 396/360 |
| 6,018,126 A | 1/2000 | Castellani et al. | |
| 6,114,623 A * | 9/2000 | Bonilla et al. | 174/484 |
| 6,127,630 A | 10/2000 | McKenzie et al. | |
| 6,179,634 B1 | 1/2001 | Hull et al. | |
| 6,265,662 B1 | 7/2001 | Riedy et al. | |
| 6,307,152 B1 | 10/2001 | Bonilla et al. | |
| 6,417,450 B1 | 7/2002 | Young | |
| 6,551,130 B2 | 4/2003 | Bonilla | |

(Continued)

FOREIGN PATENT DOCUMENTS

WO  WO2004/093278  10/2004

*Primary Examiner* — Mickey Yu
*Assistant Examiner* — Kareen Rush
(74) *Attorney, Agent, or Firm* — Hoffmann & Baron, LLP

(57) ABSTRACT

One aspect of the present invention includes a cover assembly for a floor box supporting at least one receptacle mounted therein. The assembly comprises at least one cover plate, at least one lid and a lock. The cover plate for at least partially covering the floor box includes at least one lock receiving channel. The at least one lid is pivotally secured to the cover plate for movement between a closed position covering the receptacle and an open position permitting access to the receptacle. The lock retains the lid in the closed position. Also, the lock is disposed at least partially within the channel and moveable between a locking position for retaining the lid in the closed position and at least one release position wherein the lid is not retained by the lock.

25 Claims, 4 Drawing Sheets

U.S. PATENT DOCUMENTS

| | | | |
|---|---|---|---|
| 6,552,262 B2 * | 4/2003 | English et al. | 174/485 |
| 6,592,000 B1 * | 7/2003 | Owens et al. | 220/324 |
| 6,612,081 B2 | 9/2003 | Cole et al. | |
| 6,699,050 B1 | 3/2004 | Wong et al. | |
| 6,720,495 B2 | 4/2004 | Castellani et al. | |
| 6,790,084 B1 * | 9/2004 | Osborn et al. | 439/587 |
| 6,854,226 B2 * | 2/2005 | Cole et al. | 52/220.8 |
| 6,929,291 B2 * | 8/2005 | Chen | 292/251.5 |

* cited by examiner

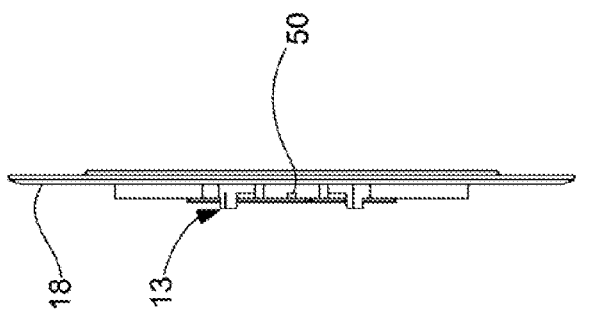
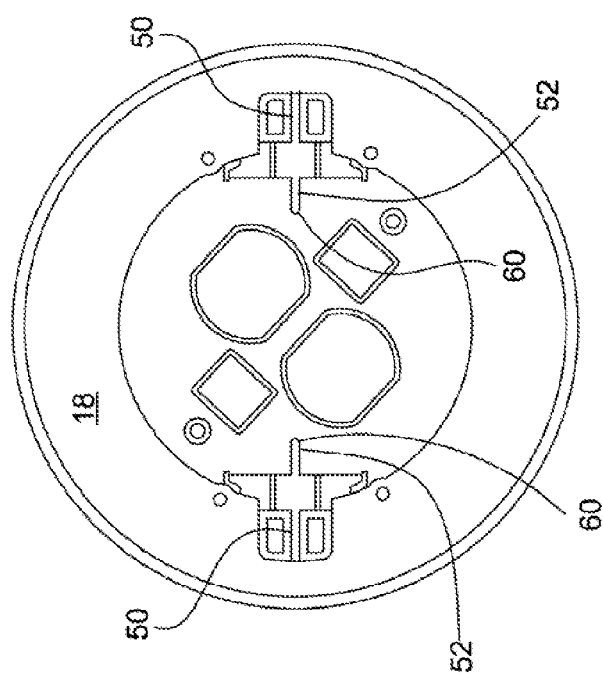
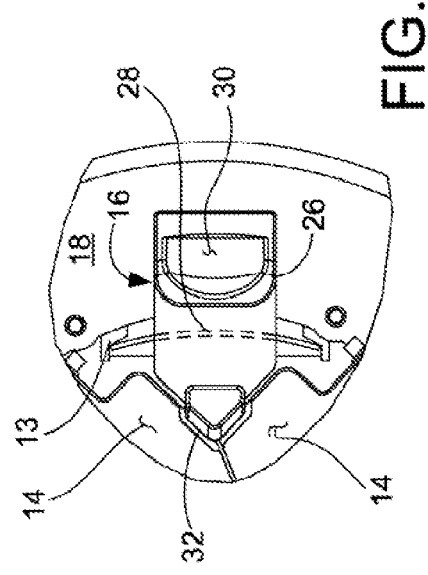
FIG. 15
FIG. 9
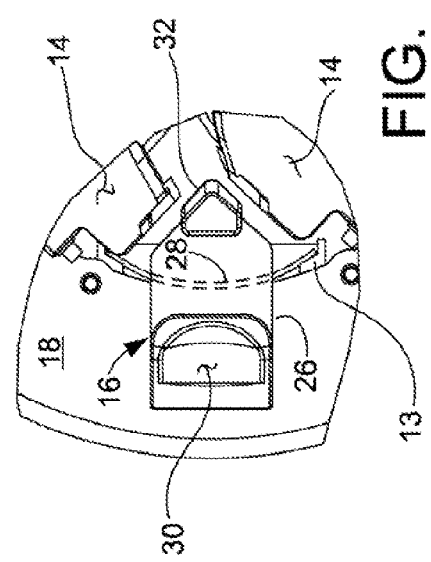
FIG. 14
FIG. 8

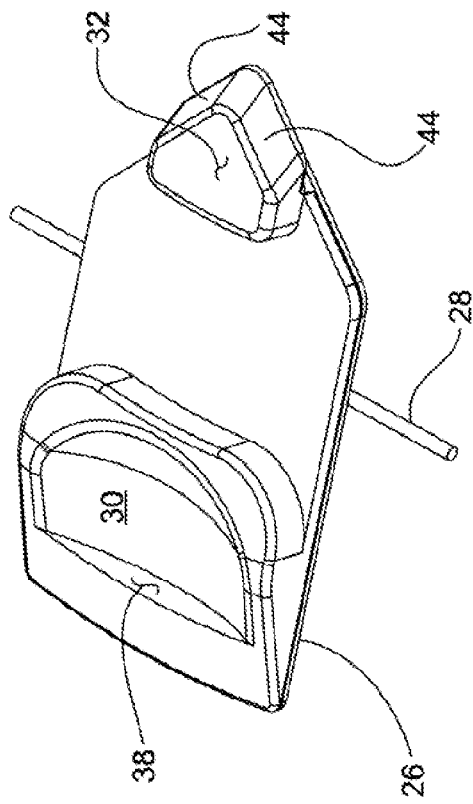
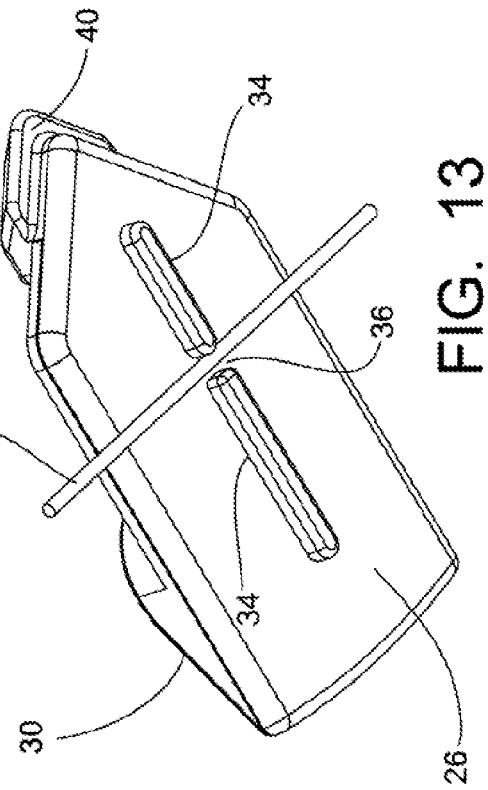
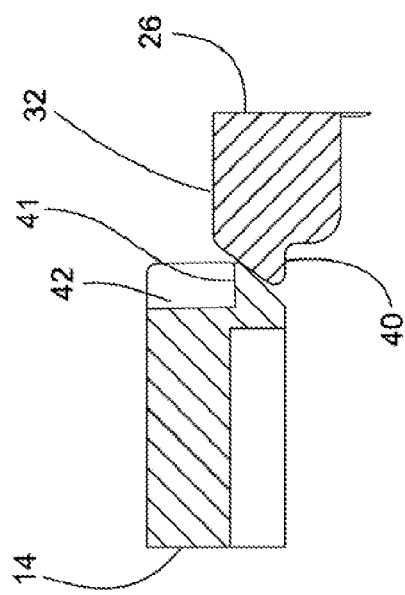
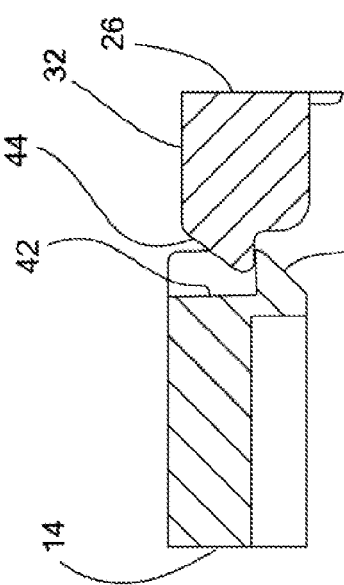

ELECTRICAL FLOOR BOX COVER WITH SLIDE LOCKS

CROSS-REFERENCE TO RELATED APPLICATIONS

This application claims the benefit of U.S. Provisional Patent Application Ser. No. 60/780,617 filed on Mar. 9, 2006.

BACKGROUND OF THE INVENTION

This invention related generally to floor box covers and more particularly to those covers employing one or more pivotally secured lids that cover the one or more receptacles mounted within the floor box.

Floor box covers with individual pivotal lids are quite well known in the art. Some examples of this can be found in U.S. Pat. No. 5,064,969, U.S. Pat. No. 6,114,623 and U.S. Pat. No. 6,790,084. As shown therein, a screwdriver or other tool is inserted into a notch located generally opposite the hinge and is used to pry the lid upwards thereby exposing one electrical socket underneath. They may or may not be latched or wedged in the closed position and hence it may not take much effort to raise them.

An improvement on this basic design is shown in U.S. Pat. No. 4,443,654, U.S. Pat. No. 5,422,434 and U.S. Pat. No. 6,179,634. In each of these patents the lid is even more securely restrained in the closed position should such be required, for example, to exert pressure on a gasket. This mechanical restraint takes the form of a screw head that has been modified so as to have a straight or flat edge. The screw is rotated to align the flat edge with the edge of the lid thereby enabling the lid to open. When the lid is to be locked closed, the screw is again rotated so that its round circumference now overlaps the edge of the lid thereby preventing the lid from opening. Obviously, such a design requires the use of a tool to rotate the screw as needed.

A different approach is shown in U.S. Pat. No. 4,770,643, U.S. Pat. No. 6,018,126 and U.S. Pat. No. 6,854,226. Each of these covers incorporates a sliding door that blocks the user from connecting a plug to the covered electrical fixture. To expose the fixture, the door must be slid back so that the prong openings in the door align with the prong openings in the fixture. These designs to not use pivotal lids as in the earlier examples.

U.S. Pat. No. 6,552,262 improves upon the above design in that it incorporates a pivotal lid along with a sliding door, both of which must be activated if the user is to access the covered fixture. Other versions of floor box covers are shown in U.S. Pat. No. 6,265,662 and U.S. Pat. No. 6,417,450. They rely upon either a bendable rod or a locking hook arrangement to retain a lid in place.

There is therefore a need for an improved floor box cover with a new means of latching or securing pivotal lids in the closed position as well as easily enabling their release. The lid(s) of such an improved cover should be useable without the need for tools or other implements that may be required to pry the lid upwards. Additionally, such a cover should have a latching mechanism that can operate multiple lids rather than there being a single mechanism for a single lid as previously taught. Further, a mechanism should be provided that, except for the immediate operation of releasing the lid, returns back to its normal position while the fixture is in use. Further still, a mechanism should be provided that can be easily closed and locked in that position by pressing down upon the lid, such as with a foot. Hence, there should be no need for the user to manipulate the device by hand to close and lock the lid as previously required. Additionally, the cover should be designed such that if the lid is inadvertently left in the open position, it will automatically become locked by simply stepping on the cover. These and many objects and advantages of this invention will become apparent upon further review and investigation.

SUMMARY OF THE INVENTION

One aspect of the present invention includes a cover assembly for a floor box supporting at least one receptacle mounted therein. The assembly comprises at least one cover plate, at least one lid and a lock. The cover plate for at least partially covering the floor box includes at least one lock receiving channel. The at least one lid is pivotally secured to the cover plate for movement between a closed position covering the receptacle and an open position permitting access to the receptacle. The lock retains the lid in the closed position. Also, the lock is disposed at least partially within the channel and moveable between a locking position for retaining the lid in the closed position and at least one release position wherein the lid is not retained by the lock.

Additionally, the cover assembly can include a lock that is generally biased toward the locking position. The bias can be provided by a spring or similar element. The lid and/or the lock can include a resetting element whereby the lock automatically moves to the release position and then to the locking position in response to the lid being moved into the closed position. Also, the lid includes a first lid and a second lid, whereby the lock retains the first and second lids when the lock is in the locking position. Further, the first and second lids can pivot about a first and a second axis of rotation, respectively, wherein the first axis is not parallel to the second axis. The lock can include at least one protruding element, wherein at least a portion of the protruding element is preferably disposed within the channel. The lid and/or the lock can include a surface promoting sliding engagement between the lid and the lock. Also, the lid can include a first latching portion and the lock can include a second latching portion. Thus, the lock can retain the lid in the closed position when the first and second latching portions are engaged. Further, the first latching portion can include a depression and the second latching a protruding portion. Further still, the cover plate can include at least two cover plates, with the lock at least partially disposed between the plates.

Another aspect of the present invention includes a cover assembly for a floor box supporting a plurality of receptacles mounted therein. The assembly includes at least one cover plate, a plurality of lids and at least one lock. The cover plate at least partially covers the floor box. The plurality of lids are each pivotally secured to the cover plate for movement between a closed position covering at least one of the plurality of receptacles and an open position permitting receptacle access. The lock retains the plurality of lids in the closed position. Also, the lock is moveable between a locking position for retaining the plurality of lids in the closed position and at least one release position wherein the lids are not retained by the lock.

Additionally, the cover assembly can include a lock that is generally biased toward the locking position. The bias can be provided by a spring or similar element. Each of the lids or the lock can include a resetting element whereby the lock automatically moves to the release position and then to the locking position in response to any one of the lids being moved into the closed position. The cover plate can also include at least one lock retaining channel and at least a portion of the lock can be disposed within that channel. The lock can include at least one protruding element, wherein at least a portion of the protruding element is the portion of the lock disposed within the channel. The plurality of lids can include a first lid and a second lid. The first and second lids pivot about a first and a second axis of rotation, respectively. Also, the first axis is preferably not parallel to the second axis. Additionally, the lids can include a first latching portion and the lock can include a second latching portion. The lock retains at least one of the lids in the closed position when at least one of the first latching portions is engaged with the second latching portion. Further, at least one of the lids and the lock can include a surface promoting sliding engagement between the lids and the lock. Further still, the at least one cover plate can include at least two cover plates and the lock can be at least partially disposed between the plates.

BRIEF DESCRIPTION OF THE DRAWINGS

FIG. 8 is a relief plan view, similar to that illustrated in FIG. 4, with the top cover plate removed.

FIG. 9 is a relief plan view, similar to that illustrated in FIG. 3, with the top cover plate removed.

FIG. 10 is a section view of the latching portions of a cover assembly in accordance with an embodiment of the present invention with the lid engaged with but not retained by the lock mechanism.

FIG. 11 is section view similar to that illustrated in FIG. 10, but with the lid retained by the lock mechanism.

FIG. 12 is a top perspective view of the lock mechanism in accordance with an embodiment of the present invention.

FIG. 13 is a bottom perspective view of the lock mechanism illustrated in FIG. 12.

FIG. 14 is a top plan view of the bottom cover plate in accordance with an embodiment of the present invention.

FIG. 15 is a side view of the bottom cover plate illustrated in FIG. 14.

DETAILED DESCRIPTION OF A PREFERRED EMBODIMENT

Figure 1:
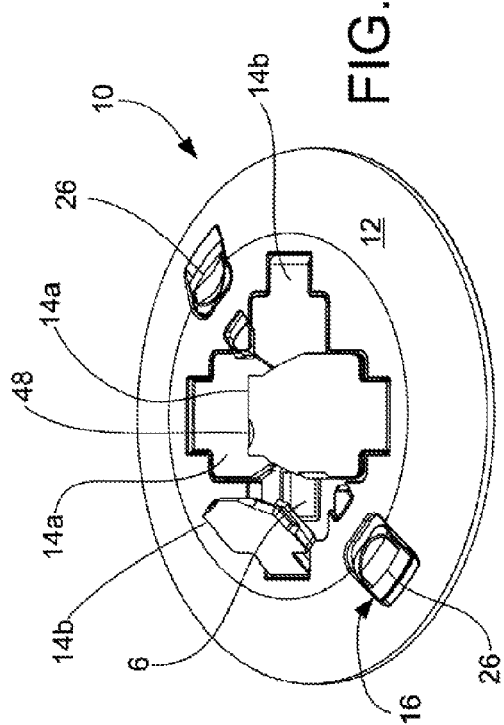
FIG. 1 is a top perspective view of a cover assembly in accordance with an embodiment of the present invention with two lids latched closed and two lids partially open.
Figure 2:
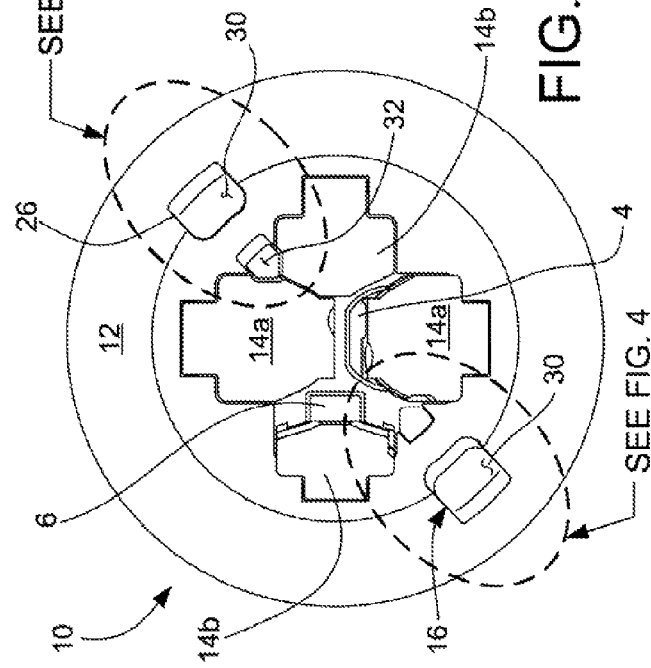
FIG. 2 is a plan view of the cover assembly as illustrated in FIG. 1.

Referring to the drawings, FIGS. 1 and 2 illustrate cover plate assembly 10 showing an upper cover plate 12, two sets of receptacle lids 14a, 14b and a locking mechanism 16. The upper cover plate 12 is preferably intended to cover a substantial portion of a floor recess holding a receptacle floor box (not shown). The lids 14a, 14b cooperate to cover and protect the receptacles 4, 6 contained within the floor box, while also providing convenient access to those receptacles 4, 6 when desired. While, cover plate assembly 10 is preferably round, it can alternatively be almost any other shape (generally another geometric shape, such as a square, rectangular, etc.). Also, cover plate 10 while preferably composed entirely of metal, it could be composed entirely of plastic, metal or any combination of materials the manufacturer deems appropriate for the application.

The two sets of lids 14a, 14b include two larger lids 14a which are preferably configured to cover separate receptacles 4 of a typical double outlet electrical fixture. However, these two larger lids 14a could also be configured to cover separate power receptacles for different types of fixtures, such as a GFCI receptacle, or even one or more switches. Likewise, the two smaller lids 14b each preferably cover a single communication/data jack 6. It should be noted, however, that these lids 14a, 14b could alternatively be either the same size or their size difference could be reversed. One lid 14a, 14b from each of the two sets is shown unlatched and partially pivoted open in FIGS. 1, 2, and 4. The other two lids 14a, 14b are shown closed and securely locked in place in FIGS. 1, 2 and 3.

The lids 14a, 14b could be designed to cover any floor box receptacles. It should be understood that while only power 4 and communication/data 6 receptacles are illustrated herein, receptacles for switches, indicators, or other fixtures could also be supported within a floor box in accordance with the present invention. Other embodiments could employ a lesser or greater number of lids. Also, these lids can each be designed to cover more than one of the same types of receptacles, many different types of receptacles or any combination thereof. Additionally, a single lid can be designed to cover a single, multiple or different types of receptacles.

FIGS. 1 and 2 also show leveraging notches 48 in some of the lids 14a. These notches 48 can make it easier for a user to open or upwardly pivot the lids 14a from their closed positions. It should be understood that similar notches 48 could be provided in all the lids, if desired. Preferably, a user can engage notches 48 with a finger tip or finger nail in order to raise a lid 14a, 14b. However, if desired notch 48 could be a smaller rectangular shape for receiving a screw driver or alternatively shaped to receive a custom tool. Also, as a further alternative the notches 48 need not be provided.

The locking mechanism 16 of the present invention is preferably included for easily securing and releasing the lids 14a, 14b. The primary element of the locking mechanism that is visible in FIGS. 1-4 is the slide lock 26. FIGS. 1-4 show two locks 26. In FIG. 2, the lock 26 in the upper right-hand portion is shown in a locking position (also shown in a relief view in FIG. 3), while the lock 26 in the lower left-hand portion is in a release position (also shown in relief view in FIG. 4).

As discussed further below, the locks 26 are preferably biased toward the locking position, but configured to allow a user to overcome the biasing force and slide them toward a release position. The locking position for each lock 26 retains up to two lids 14a, 14b in a closed position, while the release positions in each lock 26 allow pivotal movement of one or both lids 14a, 14b. The lids are preferably independently pivotal, such that although two lids 14a, 14b can be secured by one lock 26, one can be pivoted to an open position while leaving the other in a closed position. Also, due to their radial configuration, the locks 26 move or slide radially between a locking position and one or more release positions. For the locks 26, the locking position is closer to the radial center of the cover plate assembly 10. When a user slides the locks 26 toward the outer periphery of the assembly 10, they move into the release positions.

Figure 3:
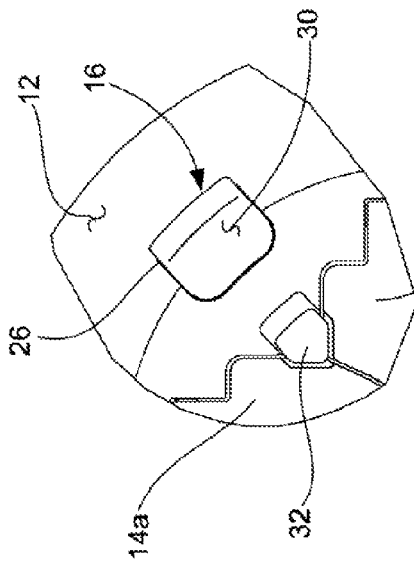
FIG. 3 is a relief plan view of the top right portion of the cover assembly as illustrated in FIG. 2.
Figure 4:
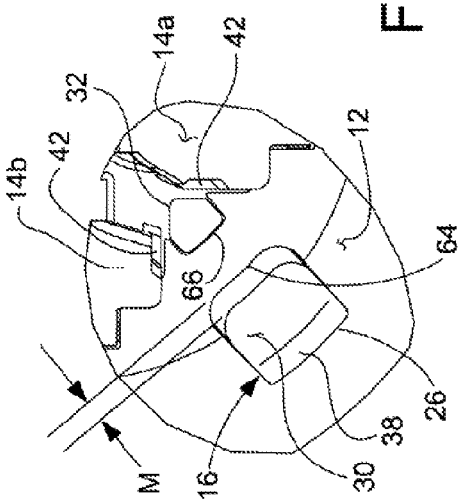
FIG. 4 is a relief plan view of the bottom left portion of the cover assembly as illustrated in FIG. 2.

As shown in FIGS. 3 and 4, the locks 26 include a manual engagement surface 30. The engagement surface 30 is preferably included to accommodate a user's finger for moving or sliding the lock 26 out of the locking position. On the radially inner side, the locks 26 are preferably provided with a latching portion 32. The lids are also preferably provided with a lock engagement portion or recess 42, shown in FIG. 4. The latching portion 32, when in the locking position, engages the lock engagement portion 42 of one or more lids 14a, 14b, as shown in FIG. 3 retaining the lids in a closed position.

Figure 5:
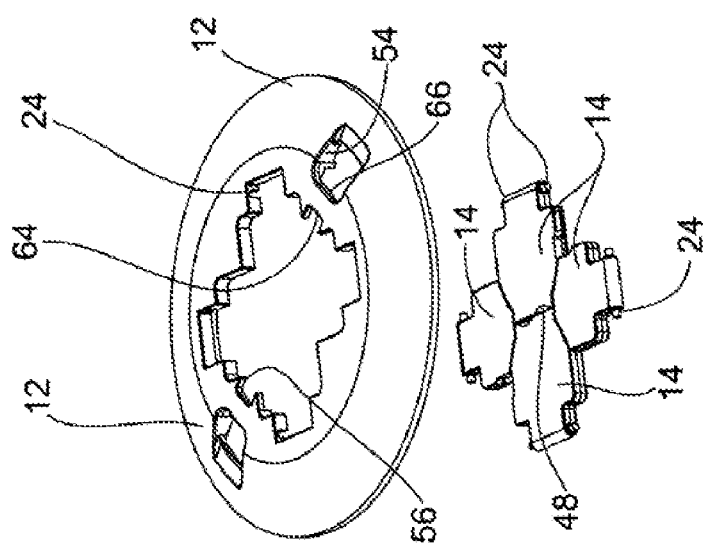
FIG. 5 is an exploded top perspective view of the top cover plate of the cover assembly in accordance with an embodiment of the present invention.

As shown in FIG. 5, each lid 14 (lids 14a and 14b are referred to herein and in FIGS. 5, 6, 13 and 14 collectively as lids 14) is pivotally secured to top cover plate 12 via protruding axles 24 that fit within mating surfaces in top cover plate 12. Other mechanisms for accomplishing pivoting or rotational movement can also be employed, such as concave recesses on each lids 14a, 14b that accept therein a similar axle or form a rotational axis in cover plate 12. The purpose of axles 24 is to enable each lid 14a, 14b to be hinged to cover plate 12 so that the lids 14a, 14b can be pivoted to the open position when access to the underlying receptacle is desired. Due to the ninety-degree configuration of the lids 14, the axis of rotation of adjacent lids is orthogonal to one another. Alternatively, the lids could be offset from one another by greater or less than ninety-degrees. However, adjacent lids would preferably not have parallel axis of rotation.

Figure 7:
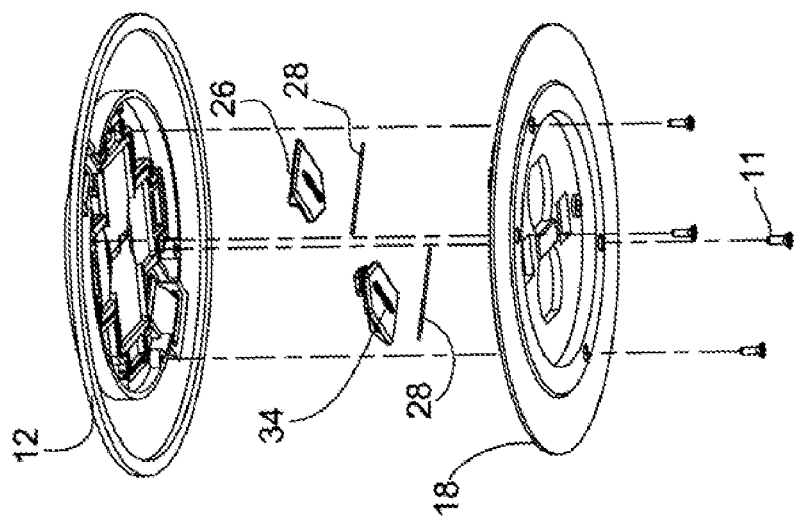
FIG. 7 is a bottom partially exploded view of the cover assembly illustrated in FIG. 6.
Figure 6:
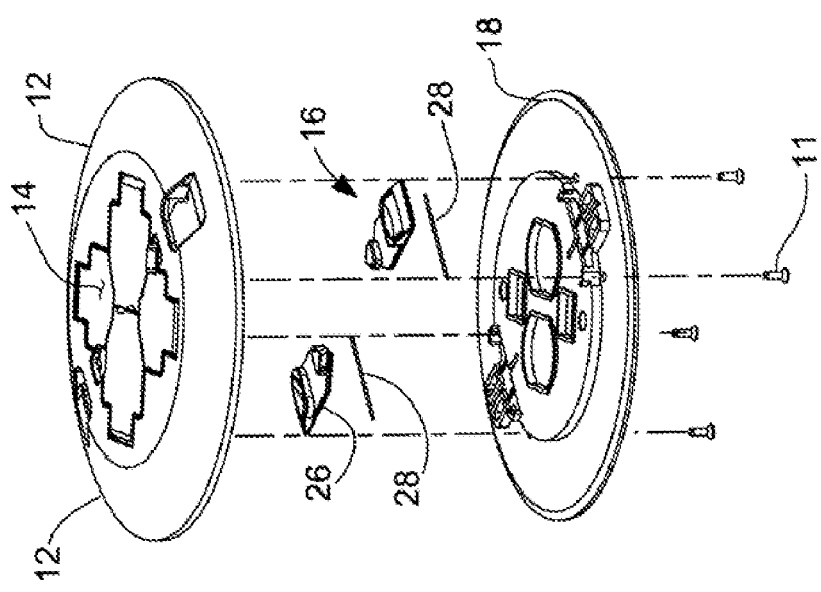
FIG. 6 is a top partially exploded view of the cover assembly in accordance with an embodiment of the present invention.

With reference to FIGS. 6 and 7, the lower cover plate 18 cooperates with the upper cover plate 12 to retain and guide the locking mechanism 16, which are sandwiched and/or at least partially disposed there between. Preferably, the lower cover plate 18 is removeably secured to the upper cover plate 12 by retaining screws 11. However, other known methods of securing these two members could also be used. The lower cover plate 18 is preferably designed to accommodate and frame a contemporary dual outlet power receptacle 4 and a pair of communication/data receptacles 6. These partially exploded assembly views also show the locks 26 separated from the spring wires 28 that provide a radial bias for the locking mechanism 16.

Although not illustrated in the drawings, a gasket material can be provided between the lids 14 and the lower cover plate 18. Such a gasket could provide a better seal for the lids 14 while retained in the closed position. Additionally, such a gasket could be designed to provide a natural bias for the lids to upwardly pivot once released from the locking mechanism 16. Such an upward bias on the lids could make it easier for a user to grasp one or more lids 14 and rotate them to an open position.

As particularly shown in FIGS. 8 and 9, spring wire 28 extends transversely underneath lock 26. The opposite ends of spring wire 28 are secured and held in a spring seat 13 formed in bottom cover plate 18. Alternatively, the spring seat 13 could be formed in the top cover plate 12, such that the wire 28 could still be disposed in the same or similar position relative to the assembly 10. Hence, as lock 26 is moved toward the outer perimeter of the assembly 10, such movement is resisted by spring wire 28. Preferably, the spring wire 28 is pre-loaded by the seat 13 which holds it in a flexed position. This provides a constant bias for maintaining the lock 26 in the closed/locking position shown in FIG. 9. Movement of the lock 26 toward a release/open position, as shown in FIG. 8, is further resisted by spring wire 28. The additional deflection of spring wire 28 encourages the locking mechanism to return to the closed/locking position. Alternatively, the wire 28 could be so configured so that no bias is transferred to the lock 26, unless it is moved away from the locking position. Thus, only upon movement of lock 26 will a biasing force be generated by the wire 28. Also, other devices can be employed to bias slide lock 26, such as a spring steel band, a coil spring, or even a deformable elastic material that can 'push-back' when deformed thereby providing a biasing force.

As particularly shown in FIGS. 10 and 11, lid latching portion 32 of lock 26 is preferably configured with an overhanging lip or protruding portion 40 which is designed to engage and extend over a portion of lids 14. Preferably, when the lock 26 is in the locking position and the lid is in the closed position, as shown in FIG. 11, the protrusion 40 overhangs an edge 41 of lid 14. When the protrusion 40 overhangs and engages the lid edge 41, the lid 14 is prevented from pivoting upwardly toward an open position. When the lock 26 is moved against the bias of spring wire 28 to a release position, the protrusion 40 would no longer overhand lid 14 thereby releasing it and allowing it to pivot to an open position. Thus, as shown in FIG. 4, preferably lock 26 is allowed sufficient sliding movement "M" to allow protrusion 40 to clear lid edge 41, thereby permitting the lid 14 to pivot open. Once the lid 14 is opened (whether fully or not), manual engagement portion 30 can be released and the spring wire 28 will bias the lock 26 back to the retaining position.

Preferably, the edge 41 is disposed within a notch or depression 42. This depression 42 is shaped to accept all or a portion of protrusion 40 therein. Ideally, adjacent lids 14 have notches 42 and retaining edges 41 adjacent to each other such that one protrusion 40 from a single lock 26 can engage and retain two lids 14 simultaneously, as shown in FIG. 9. Thus, preferably a single slide lock 26 will be able to operate at least two adjacent lids 14.

Additionally, protrusion 40 of lock 26 preferably includes a beveled upper surface 44. Similarly, the underside of retaining edge 41 can include a beveled surface 46. Such beveled surfaces 44, 46 promote sliding engagement between the lid 14 and lock 26. Thus, when lid 14 is rotated from an open position into a closed position, the leveled surfaces 44, 46 come in contact. The slant of surfaces 44, 46 can translate the vertical closing force or pressure of lid 14 into a horizontal force for overcoming the bias of the locking mechanism 16 and sliding lock 26 toward a release position. By sliding the lock 26 out of the way, the lid can then fully close. In this way retaining edge 41 rotates downward past the protrusion 40, removing the horizontal force and allowing the lock 26 to slide back into a locking position. In this way, the lock is said to have a resetting element whereby the lock automatically slides to a release position and then to a locking position in response to the lid being moved into the closed position.

It should be understood that instead of a straight bevel 44, 46, those surfaces could be rounded, curved or otherwise shaped differently. Also, even the straight beveled surfaces 44, 46 can be inclined to a greater or lesser degree. Alternatively, only one of the two surfaces 44, 46 need be provided with a bevel or the two surfaces 44, 46 could be provided with different bevels. Such bevels are primarily intended to promote sliding engagement between the lock 26 and each lid 14.

FIGS. 12 and 13 show greater detail of portions of the locking mechanism 16. In particular, lock 26 can include both a manual engagement surface 30 as well as an inclined bearing surface 38. The upright or inclined bearing surface 38 can also assist a user to slide the lock 26. Manual engagement surface 30 and/or bearing surface 38 are preferably provided with either a single curved surface or a generally ergonomic shape that will readily accommodate a user's digit there against.

FIG. 13 also shows the underside of lock 26, which includes a protruding element or rib 34. The rib 34 includes a passageway or gap 36 separating the rib 34 into two sections (inner and outer sections). Spring wire 28 preferably passes through this gap 36, thus coupling the lock 26 and spring wire 28. In this way, the wire 28 translates its spring force against the rib 34 and thus to lock 26. While the rib 34 is shown as an elongate protrusion, it could alternatively be made shorter or consist of one or more guide pins protruding from the lock 26. Also the rib 34 need not be central located on the bottom side of the lock 26.

FIGS. 14 and 15 show grooves or lock receiving channels 50, 52 in the lower cover plate 18 into which the lock rib 34 preferably fits. The lower channels 50, 52 should allow sliding movement of the rib 34, thus acting as a guide or track for the locking mechanism 16. The outer channel 50, located closer to the periphery of the assembly 10, preferably guides the longer outer section of rib 34. The inner channel 52, located closer to the center of the assembly 10, preferably guides the shorter inner section of rib 34. While the position of these lower channels 50, 52 could be alternatively designed, they preferably align with the protruding element 34, to act as a guide or track. Additionally, as shown in FIG. 5 the upper cover plate is also preferably provided with lock receiving channels 54, 56 which guide the locking mechanisms 16, as with channels 50, 52 discussed above. Both the upper channels 54, 56 and lower channels 50, 52 can include an end stop 60, 64, 66 (see FIGS. 5 and 14) that limit the movement of the lock 26.

Further, while the illustrated embodiments disclose slide locks 26 that move linearly, alternatively arched movement along a curved track or rotational movement about a pivot axis is also contemplated. In such alternate versions, movement of the lock would curve or rotate about an axis extending vertically (away from the floor box). Preferably the curved or pivotal movement remains within the planes of the cover plates. However, regardless of the path or type of movement designed for locks 26 (i.e., sliding, pivotal, linear or nonlinear), they need to move between a locking position and at least one release position.

While certain configurations of the various component parts of cover assembly 10 are disclosed herein, it should be understood that other configurations of these components are equally likely and can perform the same function as described. Further, while some such components are likely to be made of either a metal or plastic material, this is not always the case and should not be assumed. Also, while select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A cover assembly for a floor box supporting at least one receptacle mounted therein, said assembly comprising:
   at least one cover plate for at least partially covering said floor box, said at least one cover plate including a top surface and at least one lock receiving channel;
   at least one lid pivotally secured to said cover plate for movement between a closed position covering said receptacle and an open position permitting access to said receptacle; and
   a lock for retaining said lid in said closed position, at least a portion of said lock being disposed within said channel and below said top surface, said lock moveable between a locking position retaining said lid in said closed position and a release position wherein said lid is not retained by said lock, wherein at least one of said lid and said lock includes a resetting element whereby said lock automatically moves to said release position and then moves in an opposite direction to said locking position in response to said lid being moved into said closed position, wherein in said release position said at least one lid is not in contact with said lock.

2. The cover assembly plate as set forth in claim 1 wherein said lock is generally biased toward said locking position.

3. A cover assembly for a floor box supporting at least one receptacle mounted therein, said cover assembly comprising:
   at least one cover plate for at least partially covering said floor box, said at least one cover plate including a top surface and at least one lock receiving channel;
   a first lid and a second lid, each of the first and second lids being pivotally secured to said cover plate for movement between a closed position covering said receptacle and an open position permitting access to said receptacle; and
   a lock for retaining said first and second lids in said closed position, at least a portion of said lock being disposed within said channel and below said top surface, said lock moveable between a locking position retaining said lid in said closed position and a release position wherein said first and second lids are not retained by said lock, wherein at least one of said lids and said lock includes a resetting element whereby said lock automatically moves to said release position and then moves in an opposite direction to said locking position in response to at least one of said lids being moved into said closed position, whereby said lock retains said first and second lids when said lock is in said locking position.

4. The cover assembly as set forth in claim 3, wherein said first and second lids pivot about a first and a second axis of rotation, respectively, and said first axis is not parallel to said second axis.

5. The cover assembly as set forth in claim 1, wherein said lock includes at least one protruding element for directly engaging said at least one lid, wherein an upper surface of said protruding element is disposed within said channel.

6. The cover assembly as set forth in claim 1, wherein at least one of said lid and said lock includes a surface promoting sliding engagement between said lid and said lock whereby movement of said lid from said open position to said closed position moves said lock radially and outwardly with respect to said at least one cover plate.

7. The cover assembly as set forth in claim 1, wherein said lid includes a first latching portion and said lock includes a second latching portion, whereby said lock retains said lid in said closed position when said first and second latching portions are engaged.

8. The cover assembly as set forth in claim 7, wherein said first latching portion comprises a depression and said second latching portion comprises a protruding portion, in the locking position the protruding portion being disposed in the depression, the first latching portion moving out of said depression when said lid is moved to said open position.

9. The cover assembly as set forth in claim 2, wherein said bias is provided by a spring.

10. The cover assembly as set forth in claim 1, wherein said at least one cover plate includes at least two cover plates and said lock is at least partially disposed between said plates.

11. A cover assembly for a floor box supporting a plurality of receptacles mounted therein, said assembly comprising:
    at least one cover plate for at least partially covering said floor box, said at least one cover plate having a top surface;
    a plurality of lids each pivotally secured to said cover plate for movement between a closed position substantially flush with said top surface and covering at least one of said plurality of receptacles and an open position permitting receptacle access; and a lock for retaining said plurality of lids in said closed position, said lock being moveable between a locking position for retaining said plurality of lids in said closed position and at least one release position wherein said lids are not retained by said lock, wherein said plurality of lids includes a first lid and a second lid, and said first and second lids pivot about a first and a second axis of rotation, respectively, and said first axis is not parallel to said second axis, wherein said lock is disposed substantially below said top surface and between both said first lid and said second lid.

12. The cover assembly as set forth in claim 11 wherein said lock is generally biased toward said locking position.

13. The cover assembly as set forth in claim 11 wherein each of said lids or said lock includes a resetting element whereby said lock automatically moves to said release position and then to said locking position in response to any one of said lids being moved into said closed position.

14. The cover assembly as set forth in claim 11, wherein said cover plate includes at least one lock receiving channel in said top surface and at least a portion of said lock is disposed within said channel.

15. The cover assembly as set forth in claim 14, wherein said lock includes at least one protruding element, for directly engaging said at least one lid, wherein an upper surface of said protruding element is disposed within said channel.

16. The cover assembly as set forth in claim 14, wherein said lids include a first latching portion and said at least one protruding element includes a second latching portion, whereby said lock retains at least one of said lids in said closed position when at least one of said first latching portions is engaged with said second latching portion.

17. The cover assembly as set forth in claim 11, wherein at least one of said lids and said lock include a surface promoting sliding engagement between said lids and said lock whereby movement of said lid from said open position to said closed position moves said lock toward said at least one release position.

18. The cover assembly as set forth in claim 11, wherein said at least one cover plate includes at least two cover plates and said lock is at least partially disposed between said plates.

19. The cover assembly plate as set forth in claim 1, wherein the lock movement from the locking position to the release position extends toward a periphery of the at least one cover plate.

20. The cover assembly plate as set forth in claim 11, wherein the lock movement from the locking position to the release position extends toward a periphery of the at least one cover plate.

21. The cover assembly plate as set forth in claim 3, wherein said lock is disposed between said first and second lids.

22. The cover assembly plate as set forth in claim 1, wherein at least a portion of said top surface is interposed between two remote portions of said lock for limiting movement thereof.

23. The cover assembly plate as set forth in claim 11, wherein at least a portion of said top surface is interposed between two remote portions of said lock for limiting movement thereof.

24. The cover assembly plate as set forth in claim 1, wherein said at least one lock receiving channel is substantially disposed below a top surface of said at least one cover plate.

25. The cover assembly plate as set forth in claim 11, wherein in said release position said plurality of lids is not in contact with said lock.

* * * * *